(12) United States Patent
Kirschstein et al.

(10) Patent No.: US 8,760,562 B2
(45) Date of Patent: Jun. 24, 2014

(54) CAMERA WITH PIVOTABLE PRISM

(75) Inventors: Steffen Kirschstein, Zoellnitz (DE); Florian Kolb, Jena (DE); Richard Wuerl, Jena (DE); Dirk Kraemer, Jena (DE)

(73) Assignee: Jena Optronik GmbH, Jena (DE)

( * ) Notice: Subject to any disclaimer, the term of this patent is extended or adjusted under 35 U.S.C. 154(b) by 256 days.

(21) Appl. No.: 13/068,805

(22) Filed: May 20, 2011

(65) Prior Publication Data
US 2011/0298966 A1    Dec. 8, 2011

(51) Int. Cl.
*H04N 5/225* (2006.01)
*G02B 26/08* (2006.01)
*G02B 26/10* (2006.01)
*G02B 26/12* (2006.01)

(52) U.S. Cl.
USPC .................................... 348/344; 359/211.2

(58) Field of Classification Search
USPC ................. 348/207.99, 345–349; 359/196.1, 359/201.2, 211.1, 211.2
See application file for complete search history.

(56) References Cited

U.S. PATENT DOCUMENTS

| | | | |
|---|---|---|---|
| 3,645,602 A | 2/1972 | Clave et al. | 350/36 |
| 7,889,435 B2 * | 2/2011 | Seo | 359/672 |
| 2004/0066561 A1 * | 4/2004 | Nagata et al. | 359/676 |
| 2004/0130645 A1 * | 7/2004 | Ohmura et al. | 348/333.08 |
| 2009/0128664 A1 | 5/2009 | He et al. | 348/240.1 |
| 2010/0066894 A1 | 3/2010 | Seo | 348/340 |

FOREIGN PATENT DOCUMENTS

| | | |
|---|---|---|
| DE | 20 2009 002387 U | 5/2010 |
| EP | 1 335 176 | 8/2003 |
| EP | 1 383 342 A2 | 1/2004 |
| EP | 1 679 538 A1 | 7/2006 |

OTHER PUBLICATIONS

Andrew Lynch, Beam Manipulation: prisms vs. mirrors, Mar. 2009, Photonik, pp. 45-47.*

* cited by examiner

*Primary Examiner* — Kelly L Jerabek
(74) *Attorney, Agent, or Firm* — Davidson, Davidson & Kappel, LLC

(57) ABSTRACT

A camera (1), in particular in a space vehicle, having a housing (2) which contains at least one optically sensitive exposure surface (7), and a base lens (9), having a first fixed focal length, connected thereto in each case, and which projects on the at least one exposure surface (7) and which is situated on a first optical axis (10) for the exposure surface (7). To provide the camera with various fields of view, in particular for the approach of two satellites toward one another over large distances, at least two afocal supplementary lenses (11, 12) which are each parallel with respect to their optical axes (15, 16) and spaced at a distance from the first optical axis (10) are situated in the housing (2), whose optical paths are alternately coupleable with the aid of a pivotable prism (17), to form further fixed focal lengths in an optical path of the base lens (9).

11 Claims, 3 Drawing Sheets

CAMERA WITH PIVOTABLE PRISM

This claims the benefit of German Patent Application DE 10 2010 017 057.7, filed May 21, 2010 and hereby incorporated by reference herein.

The present invention relates to a camera, in particular in a space vehicle, having a housing which contains at least one optically sensitive exposure surface, and a base lens, having a first fixed focal length, connected thereto in each case and which projects on the at least one exposure surface and which is situated on a first optical axis for the exposure surface.

BACKGROUND

Cameras having interchangeable lenses of different fixed focal lengths and zoom lenses having variable focal lengths are well known. In particular for space missions, not only are particularly stringent requirements imposed on such cameras with regard to the critical operating conditions, but in addition, such cameras having a low specific weight must also be automatically operable and low-maintenance. Furthermore, such cameras should have a wide field of view with a correspondingly large focal length range of the optical system used.

One option for adjusting variable focal lengths is zoom lenses, which allow different focal lengths by the displacement of individual optical lenses and/or lens groups. Appropriate provision of adjustment mechanisms is complicated and susceptible to malfunction, in particular under the conditions prevailing in space. A quasi-continuously tunable focal length range does not outweigh the aberrations of such zoom lenses which remain after reasonable effort has been expended.

Although multiple cameras having individual fixed focal lengths provide calibrated conditions for the individual focal lengths, with high measuring accuracy and reliability, they are rather costly and installation space-consuming due to the image capture and image processing electronics systems, together with corresponding optical sensors, which must be designed separately for each camera.

SUMMARY OF THE INVENTION

It is an object of the present invention to refine a camera, in particular for use in space, in such a way that it is possible to automatically change the focal lengths, using multiple fixed focal lengths.

The present invention provides a camera, in particular in a space vehicle, having a housing which contains at least one optically sensitive exposure surface, and a base lens, having a first fixed focal length, connected thereto in each case and which projects on the at least one exposure surface and which is situated on a first optical axis for the exposure surface, at least two afocal supplementary lenses which are each parallel with respect to their optical axes and spaced at a distance from the first optical axis being situated in the housing, and whose optical paths are alternately coupleable, with the aid of a pivotable prism, to form further fixed focal lengths in an optical path of the base lens.

The term "camera" is understood to mean a still camera or a camera which provides image sequences, preferably in real time, which has a light-sensitive chip, for example a CCD sensor, CMOS detector, or, depending on the optical radiation to be detected, another sensor suited for this purpose, as at least one exposure surface. An exposure surface may be associated with an associated base lens which is calibrated with the aid of the housing, for example. Alternatively, multiple exposure surfaces, preferably two exposure surfaces situated at a specified distance from one another, may be provided, with each of which a base lens is associated, so that stereo imaging of the optical targets on the exposure surfaces is possible when the camera is synchronously operated.

The camera is preferably used in space, for example in space vehicles such as satellites and the like. With the aid of the proposed camera as a so-called single-lens camera, having only one exposure surface and an associated optical system, distances may be observed and predicted over a wide range, from 2 km, for example, to a close range down to 60 cm, for example, for appropriate distance determination. When a binocular camera having two interspaced exposure surfaces, each having an optical system, is used, in addition to observation a rapid rotation of objects and the distance from other space vehicles such as non-cooperative satellites, landing areas, space debris, and the like may be ascertained with sufficient accuracy.

The base lens is preferably set to an infinite distance, and thus has a depth of field in a distance range of interest, such as the observation area, for the fixed focal length of 50 mm to 70 mm, for example. The base lens forms a first fixed focal length, a first prism face of the pivotable prism being permanently associated with the base lens, and a second prism face, situated parallel thereto and designed with an optical axis which is shifted parallel with respect to the optical axis of the base lens, being directed toward the field of view.

To change the fixed focal length, the output pupil of one of the afocal supplementary lenses is situated in front of this second prism face by appropriately swiveling the prism. One of the afocal supplementary lenses produces a larger fixed focal length when optically coupled to the base lens, and another afocal supplementary lens produces a smaller fixed focal length when coupled to the base lens. In this way the fixed focal length of the base lens is firmly established by the fixed focal lengths which are formed with the aid of the other supplementary lenses, thus allowing the fixed focal lengths to be changed from a wide-angle field of view to a close-range field of view, and vice versa, by rotating the prism in the same direction, and therefore, in a very rapid and efficient manner.

The afocal supplementary lenses may be designed according to the principle of a Kepler telescope, having a predefined angular magnification; for a predefined m-fold angular magnification this results in a fixed focal length of x*m for a supplementary lens of conventional design, and for an inverted supplementary lens, a fixed focal length of x/m. In each case x corresponds to the focal length of the supplementary lenses.

According to the concept of the present invention, the output pupils of the supplementary lenses are adjusted, for example with the aid of appropriate apertures or by a design of the angular magnification by the active lenses of a supplementary lens, in such a way that when they are swiveled into the second prism face, the output pupils coincide with the input pupil of the base lens. In this way, the same pupil may be adjusted at the base lens for all three fields of view.

For connecting the fixedly mounted supplementary lenses or aligning the optical path of the base lens to the desired field of view, the prism is swiveled in such a way that the second prism face is pivoted with respect to the first prism face about a common axis. As a result, the first prism face, which faces the input pupil of the base lens, rotates about the optical axis of the base lens, while the second prism face is aligned in each case with its optical axis coaxial to the optical axis of the supplementary lens which is swiveled by the prism into the optical path of the base lens. For swiveling the prism, a stepping motor may be provided which accommodates the appropriately mounted prism on a rotor situated coaxially to the first optical axis, i.e., the optical axis of the base lens. To be able to mask the stepping motor, which is thus situated in the optical axis of the base lens, from the optical path of the base lens during observation of the field of view, solely via the field of view, the second prism face of the prism is rotated into a position that is between the two supplementary lenses.

BRIEF DESCRIPTION OF THE DRAWINGS

The present invention is explained in greater detail with reference to the exemplary embodiment illustrated in FIGS. 1 through 4.

FIG. 1 shows a camera having a base lens and two supplementary lenses which may be swiveled in;

DETAILED DESCRIPTION

Figure 1:
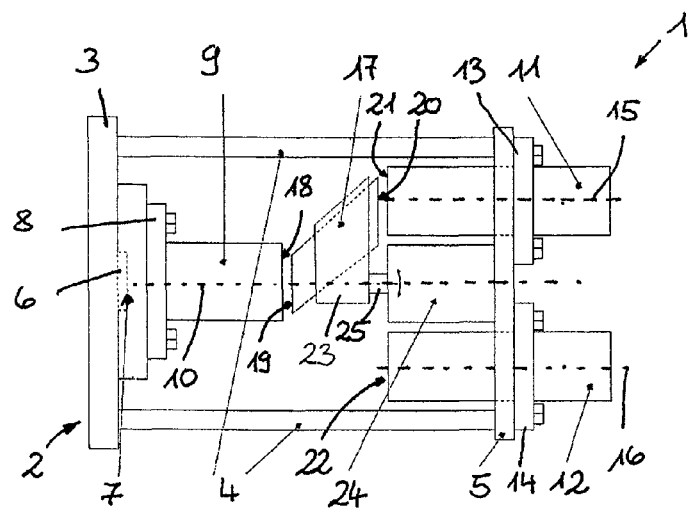

FIG. 1 schematically shows camera 1, which in the present case is a single-lens camera, having housing 2 which is formed from base plate 3, frame 4, and lens plate 5. CCD chip 6 having sensitive exposure surface 7, and which converts the optical signals striking exposure surface 7 and information into electrical signals, is fastened to base plate 3. A subsequent signal processing unit having an image memory, computation programs, and the like is not illustrated.

Base lens 9 is mounted over sensitive exposure surface 7 on base plate 3, calibrated with the aid of lens holder 8, optical axis 10 of the base lens being perpendicularly centered on exposure surface 7. Supplementary lenses 11, 12 are accommodated in lens plate 5, at a fixed distance from base lens 9, in each case parallel to optical axis 10 via an optical axis 15, 16, respectively, and situated equidistantly about optical axis 10 via lens holders 13, 14 at a calibrated distance from base lens 9.

With reference to optical axes 10, 15, 16, between the base lens on the one hand and supplementary lenses 11, 12 on the other hand, prism 17 which is rotatable about optical axis 10 is axially provided with an optically transmissive prism face 19 which is aligned parallel to input pupil 18 of base lens 9, and an optically transmissive prism face 20 which is aligned parallel to output pupils 21, 22 of supplementary lenses 11, 12, respectively. The remaining prism faces of prism 17 are mirrored, so that prism 17 acts as a light distributor which, depending on the rotation of prism 17, swivels one of supplementary lenses 11, 12 into the optical path of base lens 9, or with prism face 20 is directed onto the free space, in the present case, for example, outside the plane of the drawing. For this purpose, with the aid of mounting 23, prism 17 is accommodated on rotor 25 of stepping motor 24 which rotates about optical axis 10.

Base lens 9 is designed for a first fixed focal length of 63 mm, for example, and is focused to infinity. Supplementary lenses 11, 12, are designed as afocal Kepler telescopes with a predefined angular magnification, in the swiveled-in state supplementary lens 11 together with base lens 9 forming a near-field optical system having a fixed focal length of 200 mm, for example, while in the swiveled-in state supplementary lens 12, having the inverse design, together with base lens 9 forms a far-field optical system having a fixed focal length of 20 mm, so that the overall result, for example, is a 10-fold multiplication of the focal length. Output pupils 21, 22 of supplementary lenses 11, 12, respectively, are adjusted to input pupil 18, so that when they are swiveled in toward base lens 9 after a beam passes through prism 17, the output pupils coincide with the input pupil.

Figures 2A, 2B, 2C:
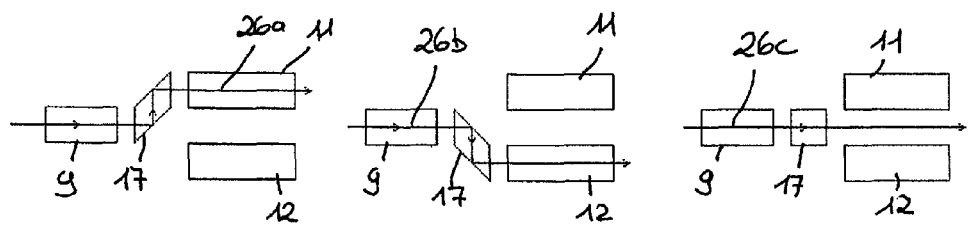
FIGS. 2a-c show possible settings of the camera in FIG. 1.

FIGS. 2a through 2c schematically show the three connection options of camera 1 in FIG. 1, with reference to central beam 26a, 26b, 26c. With the aid of prism 17, supplementary lenses 11, 12 are connected to base lens 9, or base lens 9 is operated without attachment. FIG. 2a shows the configuration of the near-field optical system having supplementary lens 11 connected in front of base lens 9 in order to form the fixed focal length of 200 mm, for example; FIG. 2b shows the configuration of the far-field optical system having supplementary lens 12 connected in front of base lens 9 in order to form the fixed focal length of 20 mm, for example; and FIG. 2c shows the optical path of base lens 9, diverted around supplementary lenses 11, 12 with the aid of prism 17, having a fixed focal length of 63 mm, for example.

Figure 3:
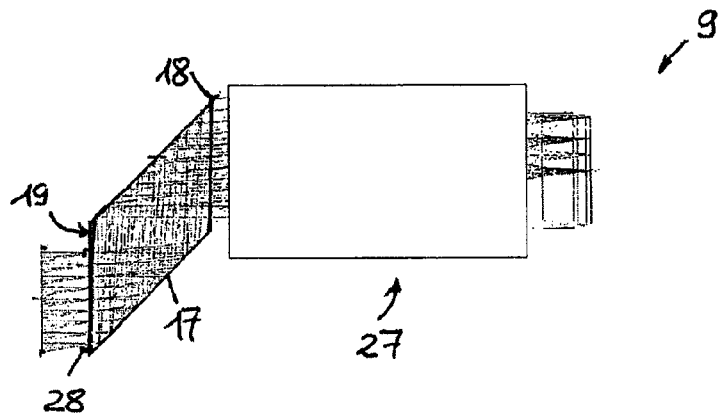
FIG. 3 shows a side view of the base lens.

FIG. 3 shows the optical path of base lens 9 through associated lens set 27, with prism 17 situated downstream. Entrance aperture 28 is situated at prism face 19 in order to set a uniform input pupil of base lens 9.

Figure 4:
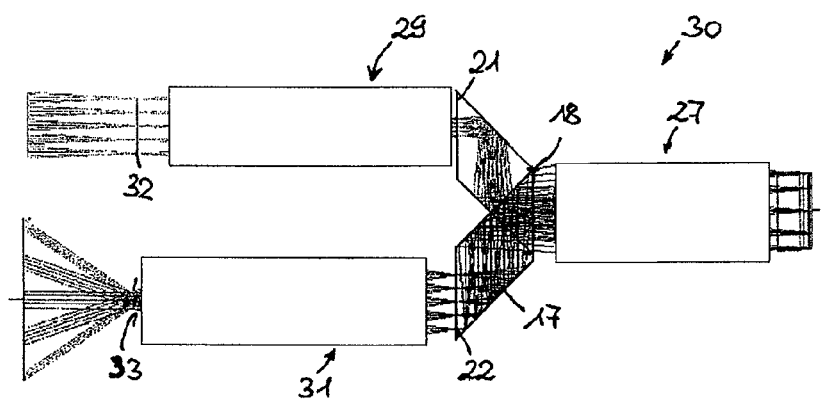
FIG. 4 shows a side view of the base lens with the supplementary lenses connected.

FIG. 4 shows a combined illustration of the optical paths of overall optical system 30 of camera 1 in FIG. 1, formed by lens sets 27 of base lens 9 (FIG. 1), prism 17, and lens sets 29, 31 of supplementary lenses 11, 12 (FIG. 1). Output pupils 21, 22 are aligned with one another and with input pupil 18 of the base lens by the configuration of the active lenses of lens sets 29, 31, and of the diameter of input pupils 32, 33 of supplementary lenses 11, 12.

Figure 5:
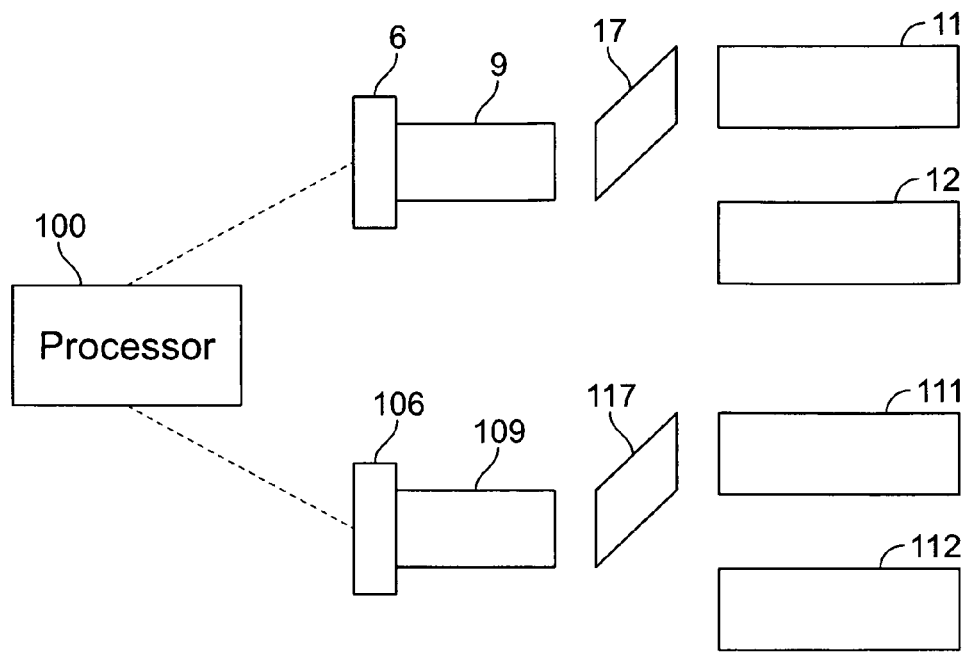
FIG. 5 shows a schematic view of a camera with two exposure surfaces for stereo imaging.

FIG. 5 shows schematically a camera with multiple exposure surfaces, preferably two exposure surfaces situated at a specified distance from one another, with each of which a base lens is associated, so that stereo imaging of the optical targets on the exposure surfaces is possible when the camera is synchronously operated. The second exposure surface 106 has an associated base lens 109, prism 117 and supplementary lenses 111 and 112. Together with the first exposure surface 6, with base lens 9, prism 17, and supplementary lenses 11 and 12, a processor 100 can use second exposure surface 106 to form a spatial image.

Figure 6:
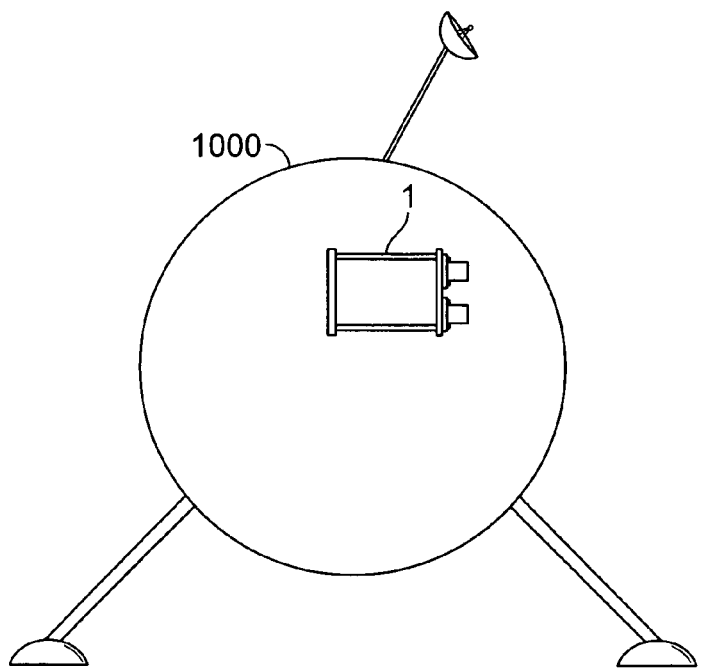
FIG. 6 shows a schematic view of the camera of FIG. 1 on a space vehicle.

FIG. 6 shows schematically camera 1 on a space vehicle 1000.

LIST OF REFERENCE NUMERALS 1 camera
2 housing
3 base plate
4 frame
5 lens plate
6 CCD chip
7 exposure surface
8 lens holder
9 base lens
10 optical axis
11 supplementary lens
12 supplementary lens
13 lens holder
14 lens holder
15 optical axis
16 optical axis
17 prism
18 input pupil 19 prism face
20 prism face
21 output pupil
22 output pupil
23 mounting
24 stepping motor
25 rotor
26a central beam
26b central beam
26c central beam
27 lens set
28 entrance aperture
29 lens set
30 optical system
31 lens set
32 input pupil
33 input pupil
100 processor
106 CCD chip
109 base lens
117 prism
111 supplementary lens
112 supplementary lens
1000 space vehicle

What is claimed is:

1. A camera comprising:
   a housing containing at least one optically sensitive exposure surface;
   a base lens having a first fixed focal length, connected thereto in each case, the base lens projecting on the at least one exposure surface situated on a first optical axis for the exposure surface;
   at least two afocal supplementary lenses, each parallel with respect to their optical axes and spaced at a distance from the first optical axis, and being situated in the housing; and
   a pivotable prism capable of alternately optically coupling optical paths of the at least two afocal supplementary lenses to form further fixed focal lengths in an optical path of the base lens.

2. The camera as recited in claim 1 wherein the base lens is focused to an infinite distance.

3. The camera as recited in claim 1 wherein a first of the afocal supplementary lenses produces a larger fixed focal length when optically coupled to the base lens compared to a second of the afocal supplementary lenses when the second afocal supplementary lens is coupled to the base lens.

4. The camera as recited in claim 1 wherein the supplementary lenses are Kepler telescopes having a predefined angular magnification.

5. The camera as recited in claim 1 wherein output pupils of the supplementary lenses are situated in such a way that the output pupils coincide with the input pupil of the base lens.

6. The camera as recited in claim 1 further comprising a stepper motor having a rotor situated coaxially to the first optical axis, the stepper motor driving the prism.

7. The camera as recited in claim 1 wherein the at least one optically sensitive exposure surface includes two optically sensitive exposure surfaces situated at a distance from one another, a first of the optically sensitive exposure surfaces provided with the base lens and the connectable supplementary lenses, and a second of the optically sensitive exposure surfaces being provided with another base lens and further connectable supplementary lenses, data ascertained from the exposure surfaces being processed to form a spatial image.

8. The camera as recited in claim 7 wherein a distance of an object from the camera is ascertained with the aid of the data of the exposure surfaces.

9. A space vehicle comprising the camera as recited in claim 1.

10. The camera as recited in claim 1 wherein the optical axes of at least two afocal supplementary lenses are each parallel with respect to the first optical axis.

11. The camera as recited in claim 1 wherein the at least two afocal supplementary lenses are fixed in position with respect to the base lens.

* * * * *